(12) United States Patent
Nasli Bakir et al.

(10) Patent No.: US 12,077,682 B2
(45) Date of Patent: Sep. 3, 2024

(54) USE OF BONDING RESIN

(71) Applicant: Stora Enso OYJ, Helsinki (FI)

(72) Inventors: Ben Nasli Bakir, Saltsjö-Boo (SE); Ashar Zafar, Älta (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 340 days.

(21) Appl. No.: 17/610,856

(22) PCT Filed: May 13, 2020

(86) PCT No.: PCT/IB2020/054503
§ 371 (c)(1),
(2) Date: Nov. 12, 2021

(87) PCT Pub. No.: WO2020/230034
PCT Pub. Date: Nov. 19, 2020

(65) Prior Publication Data
US 2022/0259466 A1    Aug. 18, 2022

(30) Foreign Application Priority Data

May 15, 2019 (SE) .................... 1950574-2

(51) Int. Cl.
| | |
|---|---|
| *C09J 103/02* | (2006.01) |
| *B27D 1/04* | (2006.01) |
| *B32B 7/12* | (2006.01) |
| *B32B 21/04* | (2006.01) |
| *C09J 105/06* | (2006.01) |
| *C09J 105/08* | (2006.01) |
| *C09J 163/00* | (2006.01) |
| *C09J 189/00* | (2006.01) |

(52) U.S. Cl.
CPC .............. *C09J 103/02* (2013.01); *B27D 1/04* (2013.01); *B32B 7/12* (2013.01); *B32B 21/042* (2013.01); *C09J 105/06* (2013.01); *C09J 105/08* (2013.01); *C09J 163/00* (2013.01); *C09J 189/00* (2013.01)

(58) Field of Classification Search
CPC .................................................... C09J 103/02
See application file for complete search history.

(56) References Cited

U.S. PATENT DOCUMENTS

| | | |
|---|---|---|
| 2010/0330376 A1 | 12/2010 | Trksak et al. |
| 2014/0331894 A1 | 11/2014 | Ah et al. |
| 2015/0329753 A1 | 11/2015 | Billington et al. |
| 2016/0186018 A1 | 6/2016 | Mikkonen |
| 2019/0144727 A1 | 5/2019 | Anderson et al. |

FOREIGN PATENT DOCUMENTS

| | | |
|---|---|---|
| CN | 105153998 A | 12/2015 |
| CN | 107083208 A | 8/2017 |
| JP | 2004231814 A | 8/2004 |
| JP | 5049079 A | 4/2009 |
| JP | 2009073895 A | 4/2009 |
| JP | 2011116930 A | 6/2011 |
| JP | 5555520 B2 | 7/2014 |
| WO | 2005113700 A1 | 12/2005 |
| WO | 2008139772 A1 | 11/2008 |
| WO | WO-2017/193015 A1 * | 11/2017 |

OTHER PUBLICATIONS

International Search report from corresponding PCT application No. PCT/IB2020/054503 mailed Dec. 6, 2020.
Engelmann, Gunnar et al., Bio-based epoxy resins with low molecular weight kraft lignin and pryrogallol, Holzforschung 2014, 68(4): 435-446.
Russell Jigxian Li, et al., A lignin-epoxy resin derived from biomass as a an alternative to formaldehyde-based wood adhesives, Green Chemistry, 2018, DOI: 10.1039/c7gc03026f.

* cited by examiner

*Primary Examiner* — Jeffry H Aftergut
(74) *Attorney, Agent, or Firm* — Greer, Burns & Crain, Ltd.

(57) ABSTRACT

The present invention relates to the use of a bonding resin prepared by providing an aqueous solution comprising at least one biobased product selected from tannin, starch, soy protein, glycerol, chitin, pectin, dextrose or other carbohydrates, or a mixture thereof and mixing the aqueous solution with one or more of certain crosslinkers such as ethers, and optionally one or more additives. The bonding resin is used in the manufacture of laminates, mineral wool insulation or wood products, such as engineered wood products, such as plywood, oriented strandboard (OSB), laminated veneer lumber (LVL), medium density fiberboards (MDF), high density fiberboards (HDF) or particle boards. Preferably, the bonding resin does not comprise lignin.

14 Claims, No Drawings

USE OF BONDING RESIN

This application is a U.S. National Phase under 35 U.S.C. § 371 of International Application No. PCT/IB2020/054503, filed May 13, 2020, which claims priority under 35 U.S.C. §§ 119 and 365 to Swedish Application No. 1950574-2, filed May 15, 2019.

FIELD OF THE INVENTION

The present invention relates to the use of a bonding resin prepared by providing an aqueous solution comprising at least one biobased product selected from tannin, starch, soy protein, glycerol, chitin, pectin, dextrose or other carbohydrates, or a mixture thereof and mixing the aqueous solution with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms, or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate; and optionally one or more additives. The bonding resin is used in the manufacture of wood products such as engineered wood products, such as plywood, oriented strandboard (OSB), laminated veneer lumber (LVL), medium density fiberboards (MDF), high density fiberboards (HDF), parquet flooring, curved plywood, veneered particleboards, veneered MDF or particle boards, laminates or mineral wool insulation. Preferably, the bonding resin does not comprise lignin.

BACKGROUND

When manufacturing wood products such as plywood and LVL, an adhesive formulation is formulated by adding fillers and extenders to phenolic resin to provide holdout on the surface, control the rheology for the specific application method and make the adhesive cheaper. The adhesive formulation is typically formulated by mixing phenolic resin, hardener, filler and/or water in a certain ratio.

One problem when preparing an adhesive formulation is to ensure that adequate properties are achieved, particularly the mechanical performance of the wood product manufactured using the adhesive formulation. At the same time, it is desirable to use as much renewable material as possible in the adhesive formulation and at the same time minimize the use of for example phenol and/or formaldehyde.

Lignin has attracted significant attention as a possible renewable substitute to primarily aromatic chemical precursors currently sourced from the petrochemical industry. During synthesis of such adhesives, phenol, which may be partially replaced by lignin, is reacted with formaldehyde in the presence of either basic or acidic catalyst to form a highly cross-linked aromatic resins termed novolacs (when utilizing acidic catalysts) or resoles (when utilizing basic catalysts).

One problem when preparing resins comprising lignin is the use of formaldehyde, when the lignin is used in formaldehyde-containing resins, such as lignin-phenol-formaldehyde resins. Formaldehyde based resins emit formaldehyde, which is a toxic volatile organic compound. The present and proposed legislation directed to the lowering or elimination of formaldehyde emissions have led to a focus on development of formaldehyde free resins for wood adhesive applications.

JP5049079B discloses a water-resistant adhesive for corrugated cardboard. The adhesive contains starch, an epoxy-based cross-linking agent, and tannin and/or hydrous inosilicate minerals. The adhesive preferably also contains borax, i.e. disodium tetra borate.

Jingxian Li R. et al. (Green Chemistry, 2018, 20, 1459-1466) describes preparation of a resin comprising glycerol diglycidyl ether and lignin, wherein the lignin is provided in solid form. One problem with the technology described in the article is a long pressing time and high pressing temperature. The 3 plies plywood sample was pressed at 150° C. temperature for 15 minutes to fully cure the resins.

Engelmann G. and Ganster J. (Holzforschung, 2014, 68, 435-446) describes preparation of a biobased epoxy resin with low molecular weight kraft lignin and pyrogallol, wherein the lignin component consists of an acetone extraction from Kraft lignin.

It would be desirable to be able to use other biobased components than lignin in the preparation of bonding resins for the wood products, laminates or mineral wool insulation.

SUMMARY OF THE INVENTION

It has now surprisingly been found that it is possible to easily prepare a bonding resin suitable for wood products, laminates, mineral wool insulation in which the use of formaldehyde can be avoided. It has also been found that an improved bonding resin can be achieved by providing at least one biobased product selected from tannin, starch, soy protein, glycerol, chitin, pectin, dextrose or other carbohydrates, or a mixture thereof in the form of a solution. Providing the at least one biobased product selected from tannin, starch, soy protein, glycerol, chitin, pectin, dextrose or other carbohydrates, or a mixture thereof in the form of a solution speeds up the reaction significantly and hence reduces the pressing time and enables the use of a lower pressing temperature for curing the bonding resin, when manufacturing for example wood products such as engineered word products, such as plywood, oriented strandboard (OSB), laminated veneer lumber (LVL), medium density fiberboards (MDF) and particle boards, laminates, parquet flooring, curved plywood, veneered particleboards, veneered MDF or mineral wool insulation.

Preferably, the bonding resin does not comprise lignin.

Preferably, the bonding resin does not comprise formaldehyde.

The present invention is thus directed to the use of a bonding resin prepared by providing an aqueous solution comprising at least one biobased product selected from tannin, starch, soy protein, glycerol, chitin, pectin, dextrose or other carbohydrates, sorbitol, or a mixture thereof and mixing the aqueous solution with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms, a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate; and optionally one or more additives, in the manufacture of a laminate, mineral wool insulation or wood product, such as an engineered wood product such as plywood, oriented strandboard (OSB), laminated veneer lumber (LVL), medium density fiberboards (MDF), high density fiberboards (HDF) or particle boards.

The glycidyl ethers used according to the present invention may be polyfunctional epoxides and the method according to the present invention may use a mixture of epoxides, such as monofunctional, di-functional, tri-functional and/or tetra-functional.

The present invention is also directed to a method for manufacturing a laminate, mineral wool insulation, wood product such as plywood, oriented strandboard (OSB), laminated veneer lumber (LVL), medium density fiberboards (MDF), high density fiberboards (HDF) or particle board wherein a bonding resin is prepared by providing an aqueous solution comprising at least one biobased product selected from tannin, starch, soy protein, glycerol, chitin, pectin, dextrose or other carbohydrates, or a mixture thereof and mixing the aqueous solution with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms, or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate; and optionally one or more additives; and wherein the bonding resin is provided to a surface in the preparation of the laminate, mineral wool insulation, wood product such as an engineered wood product such as plywood, oriented strandboard (OSB), laminated veneer lumber (LVL), medium density fiberboards (MDF), high density fiberboards (HDF), parquet flooring, curved plywood, veneered particleboards, veneered MDF or particle board, and wherein curing of the bonding resin to form an adhesive takes place when the surface is exposed to pressure and optionally heating.

DETAILED DESCRIPTION

The biobased product selected from tannin, starch, soy protein, glycerol, chitin, pectin, dextrose or other carbohydrates, or a mixture thereof used according to the present invention is preferably selected from tannin, starch, soy protein, glycerol, chitin, pectin or dextrose.

The glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units (preferably 2-5 ethylene glycol units, such as 2-3 or 4-5 ethylene units), propylene glycol diglycidyl ether having 1-3 propylene glycol units or 4-5 propylene glycol units, and/or diglycidyl ether of terminal diol having a linear carbon chain of 3-6 carbon atoms used according to the present invention acts as a cross-linker. Glycidyl ethers with more functional epoxide groups can be used such as glycerol diglycidyl ether, glycerol triglycidyl ether and sorbitol polyglycidyl ether. Other glycidyl ethers having two to nine alkylene glycol groups can be used, such as diethylene glycol diglycidyl ether, triethylene glycol diglycidyl ether, dipropylene glycol diglycidyl ether and tripropylene diglycidyl ether. As the chain lengths between two glycidyl ether groups gets longer, the resin becomes more flexible, which may negatively influence its performance. A crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N, N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate can also be used according to the present invention. It results in an adhesive during curing. Typically, the bonding resin according to the present invention is and applied to the surfaces of for example veneers, such as in the manufacture of plywood. When the veneers are pressed together, optionally under heating, the cross-linking in the bonding resin takes place, resulting in an adhesive.

An aqueous solution of the biobased product selected from tannin, starch, soy protein, glycerol, chitin, pectin, dextrose or other carbohydrates, or mixture thereof can be prepared by methods known in the art, such as by the biobased product, alkali and water. The pH of the solution is preferably in the range of from 10 to 14. Examples of alkali include sodium hydroxide, potassium hydroxide and mixtures thereof. The amount of alkali in the aqueous solution is preferably from 0.1 wt-% to 15 wt-% of the solution, such as from 0.1 wt-% to 10 wt-% of the solution.

The aqueous solution of tannin, starch, soy protein, glycerol, chitin, pectin, dextrose or other carbohydrates, or mixture thereof may be provided as an aqueous solution comprising ammonia and/or an organic base, which can be prepared by methods known in the art, such as by mixing tannin, starch, soy protein, glycerol, chitin, pectin, dextrose or other carbohydrates and ammonia and/or organic base with water. The pH of the aqueous solution of tannin, starch, soy protein, glycerol, chitin, pectin, dextrose or other carbohydrates comprising ammonia and/or an organic base is preferably in the range of from 10 to 14. Examples of organic bases include amines, such as primary, secondary and tertiary amines and mixtures thereof. Preferably, the organic base is selected from the group consisting of methylamine, ethylamine, propylamine, butylamine, ethylenediamine, methanolamine, ethanolamine, aniline, cyclohexylamine, benzylamine, dimethylamine, diethylamine, dipropylamine, dibutylamine, dimethanolamine, diethanolamine, diphenylamine, phenylmethylamine, phenylethylamine, dicyclohexylamine, piperazine, imidazole, 2-methylimidazole, 2-ethylimidazole, 2-ethyl-4-methylimidazole, 2-isopropylimidazole, 2-phenylimidazole, 2-methylimidazoline, 2-phenylimidazoline, trimethylamine, triethylamine, dimethylhexylamine, N-methylpiperazine, dimethylbenzylamine, aminomethyl propanol, tris(dimethylaminomethyl)phenol and dimethylaniline or mixtures thereof. The total amount of ammonia and/or organic base in the aqueous solution is preferably in the range of from 0.1 wt-% to 20 wt-%, preferably 0.1 wt-% to 10 wt-%, of the total weight of the aqueous solution comprising water, tannin, starch, soy protein, glycerol, chitin, pectin, dextrose or other carbohydrates and ammonia and/or an organic base. The amount of tannin, starch, soy protein, glycerol, chitin, pectin, dextrose or other carbohydrates in the aqueous solution of lignin comprising ammonia and/or an organic base is preferably from 1 wt-% to 60 wt-% of the solution, such as from 10 wt-% to 30 wt-% of the solution.

The weight ratio between the biobased product selected from tannin, starch, soy protein, glycerol, chitin, pectin, dextrose or carbohydrates, or mixture thereof (dry weight) and the total amount of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate is preferably in the range of from 1:10 to 10:1. The amount of biobased product selected from tannin, starch, soy protein, glycerol, chitin, pectin, dextrose or other carbohydrates, or mixture thereof in the bonding resin is preferably from 5 wt-% to 50 wt-%, calculated as the dry weight of the biobased product selected from tannin, starch, soy protein, glycerol, chitin, pectin, dextrose or other carbohydrates, or mixture thereof and the total weight of the bonding resin.

The bonding resin may also comprise additives, such as urea, solvents and fillers.

The amount of urea in the bonding resin can be 0-40% preferably 5-20% calculated as the dry weight of urea and the total weight of the bonding resin.

A filler and/or hardener can also be added to the bonding resin. Examples of such fillers and/or hardeners include limestone, cellulose, sodium carbonate, and starch.

Other solvents that can be used in the bonding resins according to the present invention are ethylene glycol, polyethylene glycol, propylene glycol, polypropylene glycol, sorbitol and/or any terminal diol having a linear carbon chain of 3-6 carbon atoms.

The aqueous solution of the biobased product selected from tannin, starch, soy protein, glycerol, chitin, pectin, dextrose or other carbohydrates, or mixture thereof is preferably mixed with the glycidyl ether at room temperature, such as at a temperature of from 15° C. to 30° C. The mixing is preferably carried out for about 5 minutes to 2 hours. Preferably, the viscosity of the mixture is monitored during mixing, either continuously or by taking samples and determining the viscosity thereof.

EXAMPLES

Example 1

Tannin solution was prepared first by adding 70 g of powder tannin (solid content 91%) and 107 g of water were added to a 500 ml beaker at ambient temperature and were stirred until the tannin was fully and evenly dispersed. Then, 24 g of 50% sodium hydroxide solution was added to the tannin dispersion. The composition was stirred for 120 minutes to make sure that the tannin was completely dissolved in the alkaline media.

Example 2

An adhesive formulation was prepared by mixing 23.5 g of tannin alkali solution from Example 1 and 7.5 g of polyglycerol polyglycidyl ether in a beaker for 20 minutes using an overhead stirrer at room temperature. The adhesive formulation was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C. Average data from 5 test specimens is presented in Table 1.

TABLE 1

Shear strength using ABES

| | Shear strength [N/mm$^2$] Dry Strength |
|---|---|
| Adhesive formulation | 3.4 |

Example 3

Starch solution was prepared first by adding 27 g of powder starch (solid content 90%) and 49 g of water to a 500 ml beaker at 80° C. temperature and were stirred for 60 minutes. Then, the temperature of the starch dispersion was decreased to 40° C. and 4.9 g of 50% sodium hydroxide solution was added to the starch dispersion. The composition was stirred for 120 minutes to make sure that the starch was completely dissolved in the alkaline media.

Example 4

An adhesive formulation was prepared by mixing 25 g of starch alkali solution from Example 3 and 7.5 g of polyglycerol polyglycidyl ether in a beaker for 20 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C. Average data from 5 test specimens is presented in Table 2.

TABLE 2

Shear strength using ABES

| | Shear strength [N/mm$^2$] Dry Strength |
|---|---|
| Adhesive formulation | 3.6 |

Example 5

Starch solution was prepared first by adding 27 g of powder starch (solid content 90%) and 44 g of water to a 500 ml beaker at ambient temperature and were stirred for 60 minutes. Then, 9.6 g of 50% sodium hydroxide solution was added to the starch dispersion. The composition was stirred for 120 minutes to make sure that the starch was completely dissolved in the alkaline media.

Example 6

An adhesive formulation was prepared by mixing 25 g of starch alkali solution from Example 5 and 7.5 g of polyglycerol polyglycidyl ether in a beaker for 20 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C. Average data from 5 test specimens is presented in Table 3.

TABLE 3

Shear strength using ABES

| | Shear strength [N/mm$^2$] Dry Strength |
|---|---|
| Adhesive formulation | 4.8 |

Example 7

An adhesive formulation was prepared by mixing 50 g of glycerol, 50 g of polyglycerol polyglycidyl ether and 16 g of 50% sodium hydroxide solution in a beaker for 5 minutes using an overhead stirrer at room temperature.

The adhesive formulation was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C. Average data from 5 test specimens is presented in Table 4.

TABLE 4

| Shear strength using ABES | |
|---|---|
| | Shear strength [N/mm²] Dry Strength |
| Adhesive formulation | 2.4 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method of preparing a bonding resin by:
providing an aqueous solution comprising at least one biobased product selected from a group consisting of tannin, starch, soy protein, glycerol, chitin, pectin, dextrose or other carbohydrates, and mixtures thereof;
mixing the aqueous solution with one or more of glycerol diglycidyl ether, diglycerol polyglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms, or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound or epoxidized plant-based oil, tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate.

2. The method of claim 1, wherein
the aqueous solution is mixed with one or more of glycerol diglycidyl ether, diglycerol polyglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms.

3. The method according to claim 2, wherein the aqueous solution is mixed with polyglycerol polyglycidyl ether.

4. The method according to claim 1, wherein the aqueous solution comprising at least one biobased product is an alkali solution.

5. The method according to claim 1, wherein a weight ratio between the at least one biobased product, calculated on a basis of dry biobased product, and a total amount of ether is from 1:10 to 10:1.

6. The method according to claim 1, wherein the aqueous solution is further mixed with urea, or a solvent, or both.

7. The method according to claim 6, wherein the solvent comprises glycerol, ethylene glycol, polyethylene glycol, propylene glycol, polypropylene glycol, sorbitol, any terminal diol having a linear carbon chain of 3-6 carbon atoms, or mixtures thereof.

8. The method according to claim 1, wherein the biobased product is selected from a group consisting of tannin, starch, soy protein, glycerol, chitin, pectin, dextrose, and mixtures thereof.

9. The method according to claim 1, further comprising:
providing the bonding resin to a surface in preparation of a laminate, mineral wool insulation, wood product, oriented strandboard (OSB), laminated veneer lumber (LVL), medium density fiberboards (MDF), high density fiberboards (HDF), particle board, parquet flooring, curved plywood, veneered particleboards, or veneered MDF, and
curing the bonding resin to form an adhesive by exposing the surface to pressure.

10. The method according to claim 1, wherein the aqueous solution is further mixed with one or more additives.

11. The method of claim 9, wherein the bonding resin is cured to form an adhesive by exposing the surface to pressure and heating.

12. A method for manufacturing a wood product comprising:
preparing a bonding resin by
providing an aqueous solution comprising at least one biobased product selected from a group consisting of tannin, starch, soy protein, glycerol, chitin, pectin, dextrose or other carbohydrates, and mixtures thereof, and
mixing the aqueous solution with one or more of glycerol diglycidyl ether, polyglycerol diglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, and/or diglycidyl ether of terminal diol having a linear carbon chain of 3-6 carbon atoms, or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound or epoxidized plant-based oil, tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate;

providing the bonding resin to a surface in preparation of the wood product, and curing the bonding resin to form an adhesive by exposing the surface to pressure.

13. The method according to claim 12, wherein the aqueous solution is further mixed with one or more additives.

14. The method according to claim 12, wherein the bonding resin is cured to form an adhesive by exposing the surface to pressure and heating.

\* \* \* \* \*